Figure 1:
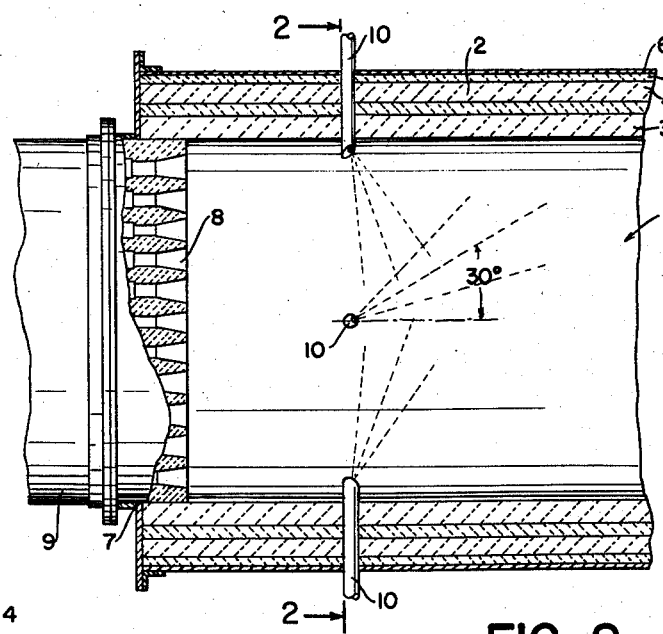

Dec. 1, 1959 A. C. WARNER 2,915,372
CARBON BLACK PROCESS
Filed June 11, 1957

INVENTOR
AMOS C. WARNER
BY
Pennie, Edmonds, Morton, Barrows & Taylor
ATTORNEYS

United States Patent Office 2,915,372
Patented Dec. 1, 1959

2,915,372

CARBON BLACK PROCESS

Amos C. Warner, Monroe, La., assignor to Columbian Carbon Company, New York, N.Y., a corporation of Delaware Application June 11, 1957, Serial No. 664,958

4 Claims. (Cl. 23—209.4)

This invention relates to the manufacture of carbon black by the decomposition of hydrocrabons, effected by dispersing the hydrocarbon in a turbulent stream of hot blast flame gases at a temperature in excess of that at which the hydrocarbons are decomposed to carbon black.

In the Wiegand and Braendle Patent 2,440,424, there is described and claimed a process of that type for producing carbon black whereby a plurality of symmetrically-positioned streams of a combustible gas mixture are blasted longitudinally into one end of an elongated, unobstructed, heat-insulated reaction chamber of circular cross-section and burned therein to form a turbulent stream of hot blast flame gases flowing longitudinally through the chamber at a temperature in excess of the decomposition temperature of hydrocarbons. The hydrocarbon to be decomposed, herein referred to as "hydrocarbon make," is separately and forcefully injected, through a plurality of radially positioned injection tubes, into the flowing stream of hot gases at a zone of the chamber downstream from the zone of injection of the combustible mixture.

The process of that patent has been extensively used in the production of carbon black embodying highly desirable rubber compounding characteristics. It has been found especially effective, when the hydrocarbon make is introduced into the furnace chamber in gas or vapor form, in producing carbon blacks of the FF grade embodying a highly desirable combination of characteristics, including relatively low or normal structure, especially useful for certain rubber compounding purposes.

By reason of present economic limitations on the use of natural gas and the difficulties and expense of vaporizing liquid oils prior to introducing them into the furnace chamber, it has become highly desirable to use a normally liquid hydrocarbon make and to inject the make into the furnace chamber as an atomized liquid spray.

The characteristics of a carbon black are influenced by the nature of the hydrocarbon make from which it is prepared, but they are also greatly influenced by the operating conditions under which the carbon black is formed. Serious difficulties have been encountered in attempting to produce, in furnaces of the type described, carbon blacks of the FF grade just noted, having low or moderate structure characteristics, by the injection of atomized liquid sprays of the hydrocarbon make into the stream of hot furnace gases.

Because of the extraordinary high temperature of the furnace side-wall at the zone of injection and the resultant tendency of the liquid hydrocarbon make to coke in the injection tubes due to excessive heating in passing through the chamber wall, special precautions are usually necessary to prevent such overheating.

In the Heller Patent 2,659,662, for instance, there is described and claimed a method by which the hydrocarbon make is effectively thermally shielded as it is passed in liquid form through the hot side-wall of the furnace chamber and is thereafter injected as a gas-atomized liquid spray into the stream of hot blast flame gases. As therein disclosed, the atomized spray is directed substantially radially into the chamber through symmetrically positioned injection nozzles so that the entering streams of hydrocarbon make spray are subjected to tremendous shearing forces of the extremely high velocity blast flame gases flowing substantially perpendicular to the entering make streams, whereby the spray streams are suddenly shattered as they enter the chamber.

In the particular operation shown in the last mentioned patent, the combustible mixture is forcefully injected tangentially into the upstream end of the furnace chamber and burned therein to form a turbulent stream of hot blast flame gases swirling at tremendous velocity as it passes through the chamber.

Though the process employing this tangential-blast has the advantage of permitting the injection of the hydrocarbon make in the form of liquid sprays, there is a tendency to produce carbon blacks of relatively high structure and high oil absorption characteristics. On the other hand, where the combustible mixture is blasted longitudinally into the furnace chamber, as disclosed by the above-noted Wiegand et al. patent, attempts to inject the hydrocarbon make as liquid sprays have not heretofore resulted in carbon blacks having the presently desired high color and low or normal structure, and further have resulted in excess coke formation.

In rubber compounding, carbon blacks of the FF and VFF types are highly desirable because they combine the characteristics of fineness and normal to moderate structure which assures maximum wear and low hysteresis in rubber tire tread where low heat build-up is required. It is, therefore, a primary object of the present invention to provide a process whereby carbon blacks having the desired low or normal structure and relatively high color, within the FF or VFF carbon grade classification, may be economically produced from normally liquid hydrocarbon makes introduced into the furnace in liquid form.

I have now found that the characteristics of the carbon black produced from a given type of liquid hydrocarbon make, by the general procedure described in the previously noted Patent 2,440,424, may be surprisingly modified by certain variations in the process and especially the manner in which the make sprays are injected into the chamber. More particularly, I have found that by injecting the atomized streams of the normal liquid hydrocarbon make into the hot gas stream in a general downstream direction, but inwardly, somewhat, from the chamber wall, so as to avoid direct impingement thereon under prevailing blast flame gas stream velocity, and so angling the symmetrical axis of the entering sprays, with respect to the longitudinal axis of the chamber, that they are directed to the corresponding side of the longitudinal axis and at an angle to the radius of the chamber, so as to cause the entering sprays to swirl about the chamber axis, I can avoid excessive coke formation and can produce the desired carbon blacks of the FF and VFF grades having relatively low or moderate structure characteristics and otherwise similar to those normally produced by the process of the patent from natural gas.

Predicated upon this discovery, my present invention provides improvements in operations of the type described in the said Wiegand and Braendle patent, in accordance with which the stream of blast flame gases is generated by injecting a combustible mixture of a hydrocarbon fuel and an oxygen-containing gas substantially longitudinally into one end of an elongated heat-insulated reaction chamber, of circular cross-section, as a plurality of streams uniformly spaced over the cross-sectional area of the chamber, and is burned as it enters the chamber to form a turbulent high velocity stream of the hot blast flame gases passing longitudinally through the chamber, and a liquid hydrocarbon make is introduced into the chamber as a plurality of symmetrically positioned radial streams, and each stream is forcefully injected into the stream of hot gases, as an atomized liquid spray, with its axis of symmetry directed inwardly somewhat from the chamber wall, so as to avoid direct impingement thereon, and downstream at an angle with the longitudinal axis of the chamber, such as to cause the entering sprays to swirl about the chamber axis.

Figure 3:
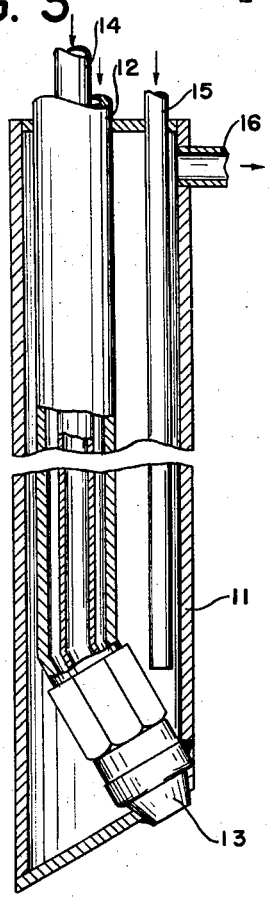
Figure 2:
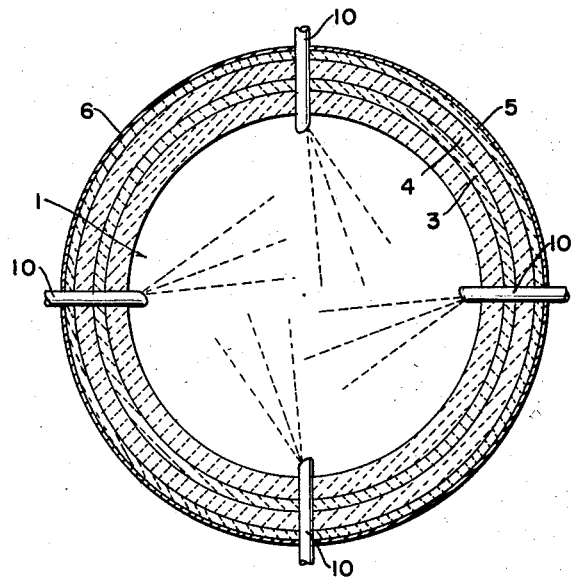

The invention will be more fully described and illustrated with reference to the accompanying drawings of which Fig. 1 is a fragmentary longitudinal sectional view of the upstream end of a cylindrical furnace chamber, Fig. 2 is a transverse sectional view along the line 2—2 of Fig. 1, and Fig. 3 is an enlarged longitudinal section view of a spray nozzle assembly especially adapted for use in injecting the hydrocarbon make into the furnace chamber.

As more fully illustrated in the previously noted Patent 2,440,424, an elongated heat-insulated chamber is represented at 1. This chamber leads at its downstream end to a cooling and collecting system, as is well understood by this art and need not here be described.

Chamber 1 is delineated by a cylindrical sidewall 2 composed of an inner lining of fire brick indicated at 3 surrounded by layers of heat insulating materials 4 and 5, respectively, all encased in a sheet metal shell 6.

A burner block 7, provided with a multiplicity of burner ports 8 symmetrically positioned over the entire area of the burner block, is fitted snugly into the upstream end of the chamber. In the particular apparatus shown, the outer end of the burner block is enclosed by a wind box, fragmentarily indicated at 9, and provided with means for blasting a combustible gaseous mixture through the burner ports.

The combustible mixture thus injected into the chamber through the burner ports is ignited and burns as it enters the chamber forming a turbulent stream of blast flame gases passing longitudinally through the chamber at a temperature substantially in excess of the decomposition temperature of the hydrocarbon make. The velocity of the stream of blast flame gases through the chamber is subject to considerable variation. I have, with particular advantage, used velocities of 75–80 feet per second, calculated at 2500° F. In general, the entering velocity of the sprays should exceed the velocity of the blast flame gases.

Extending through the side-wall of the chamber and into the chamber at a zone downstream from the zone of primary combustion are four radially-extending, two-fluid spray nozzle assemblies 10, more fully illustrated in Fig. 3.

The furnace wall at the zone of make injection is relatively thick and at an extremely high temperature. Therefore, special precautions should be taken, as previously noted, for shielding the make from excessive heating while it passes through the furnace wall.

The spray nozzle assembly illustrated in Fig. 3 comprises an outer cylindrical jacket 11 closed at each end and of sufficient length to extend entirely through the furnace side-wall and to project beyond the outer wall of the furnace and slightly into the chamber. The liquid make is charged under moderate pressure through the annular conduit 12 to the spray nozzle 13 where it mixes with the atomizing gas, e.g. steam, charged through the inner conduit 14, under a pressure advantageously within the range 50 to 200 pounds per square inch, preferably about 150 pounds. A cooling fluid, advantageously water, is charged through conduit 15, which extends through the jacket and discharges the cooling fluid at the inner end of the jacket in contact with the nozzle. The cooling fluid then flows outwardly, in thermal shielding relation with the make stream, and is discharged from the jacket beyond the outer wall through outlet 16.

The assembly just described is so constructed that the axis of the inner end of conduits 12 and 14 and of atomizing nozzle 13 forms a substantial angle, $\alpha$, with the inwardly extended longitudinal axis of the outer jacket 11. This angle may be varied somewhat but, for purposes of my present invention, is most advantageously about 30°. So as to minimize the length of the path of liquid make through the hot furnace walls, the assembly is so arranged as to extend radially through the wall so that inward extensions of the longitudinal axes of the several assembly jackets will intersect at the longitudinal axis of the furnace chamber.

This angle $\alpha$, between the axis of the nozzle and the inwardly extended longitudinal axis of the jacket of the respective assemblies, will determine the extent of deviation of the symmetrical axis of the sprays from the radial position. With the assembly illustrated, positioned so that the longitudinal axis of the furnace chamber and the longitudinal axis of the spray nozzle lie in a common plane, the respective sprays would converge at a downstream point on the longitudinal axis of the chamber, the distance downstream depending, of course, upon the angle $\alpha$, i.e. the angle by which the longitudinal axis of the spray nozzle diverges from the longitudinal axis of the jacket.

Now by so positioning the respective nozzle assemblies and thereafter rotating each assembly about its axis through an angle $\beta$, also with advantage about 30°, each assembly being rotated in the same direction, a condition is created whereby the entering sprays tend to whirl about the longitudinal axis of the chamber.

The optimum values in the angles $\alpha$ and $\beta$ will vary somewhat with the diameter of the furnace and the spread angle of the spray nozzles. With the chamber such as shown having a diameter of about 22 inches, I have obtained excellent results in operations using spray nozzles having a 30° angle of spread where both $\alpha$ and $\beta$ were about 30°.

I am unable to explain with certainty why the injection angle and the whirling of the injected make sprays, as just described, influence the characteristics of the carbon black product. However, an understanding of the principles involved is not necessary to the full utilization of the invention.

In addition, to providing further control of the properties of the carbon black product, the invention has the advantage of minimizing the danger of contact between the atomized liquid and the hot furnace walls which, in turn, minimizes the tendency toward coke formation on the chamber side-wall.

The process of the invention will be further illustrated by the following specific examples of operations in accordance therewith carried out in a cylindrical furnace 22 inches in diameter, the combustible mixture being blasted into the upstream end of the chamber through longitudinally extending burner ports uniformly spaced over the transverse area of the chamber. In each case, the hydrocarbon make was introduced into the chamber through four symmetrically positioned burner assemblies, of the construction just illustrated, extending radially through the chamber wall and atomized by steam at a pressure of about 150 pounds per square inch, the spray nozzle axis being set at an angle of 30° from the longitudinal axis of the assembly. The spray assemblies were first so set that the extended symmetrical axis of the respective spray nozzles intersected at a downstream point on the longitudinal axis of the chamber and then each assembly was turned in a corresponding direction through an angle of 30°. The hydrocarbon make used in each operation was a commercially available liquid residue from a Mid-Continent crude petroleum and having approximately the following characteristics:

| | |
|---|---|
| Index of refraction | 1.576 |
| A.P.I. gravity | 18.0 |
| Aromatics _____percent | 50–65 |
| Sulfur _____do | 1.0 |
| Asphaltines _____do | 8.0 |
| Viscosity: | |
| SSU at 100° F. | 4500 |
| SSU at 210° F. | 245 |

Example I

In this operation, combustion air was charged to the chamber at the rate of 120,00 cubic feet per hour, the air-fuel gas ratio being 10:1, and the make was charged at a total rate of 120 gallons per hour. There was obtained a yield of 3.85 pounds of carbon black per gallon of oil having an ABC color rating of 118, an oil absorption of 12.2 gallons per 100 pounds of black and an iodine absorption of 68.

Example II

In this operation, the air-fuel gas ratio was also 10:1, combustion air being charged to the furnace at a rate of 120,000 cubic feet per hour, and the make was charged at the rate of 96 gallons per hour. A yield of 3.11 pounds of carbon black per gallon of oil was obtained, the ABC color rating of the black being 128, the oil absorption characteristics being 11 gallons of oil per 100 pounds of black and the iodine absorption value being 57.

The rubber compounding characteristics of the products of the preceding examples were determined by compounding samples of the respective products with rubber in accordance with the following formula:

| | |
|---|---|
| Smoked sheet rubber | 100 |
| Carbon black | 50 |
| Zinc oxide | 3 |
| Stearic acid | 4 |
| Pine tar | 2 |
| Diphenyl amine-acetone reaction product (antioxidant) | 1.5 |
| Sulfur | 2.7 |
| Mercaptobenzothiazole (accelerator) | 0.9 |
| | 164.1 |

The respective rubber compositions were cured at 275° F. and tested by conventional methods and showed the characteristics set forth in the following tabulation:

| Example | I | II |
|---|---|---|
| Optimum Cure—minutes | 30 | 35 |
| L-300 | 1,275 | 1,275 |
| Tensile Strength | 3,950 | 4,100 |
| Elongation | 625 | 635 |
| Hardness | 65 | 62 |
| Log R Electrical Resistivity | 2.5 | 2.5 |
| Rebound | 74.0 | 72.3 |

Though the process has been found especially useful in producing carbon blacks of the particular type noted, it will be recognized that the invention is not so restricted but contemplates the use of various normally liquid hydrocarbons, as the make, and various modifications of other operating conditions within the scope of the appended claims.

I claim:

1. In the process for producing carbon black by decomposing hydrocarbons in which a combustible mixture is injected longitudinally into an elongated, cylindrical, heat-insulated reaction chamber, the combustible mixture is ignited and burned and the resultant hot blast flame gases flow at high velocity and as a turbulent stream through said chamber at a temperature in excess of the decomposition temperatures of hydrocarbons, and the hydrocarbon to be decomposed is separately and forcefully injected into, and intimately mixed with, the hot gas stream flowing through the chamber and is decomposed by heat absorbed from the hot gases to form carbon black in gaseous suspension, the suspension being passed from the reaction chamber and the carbon black separated and collected, the steps of passing the hydrocarbon to be decomposed in substantially liquid form through the chamber wall as a plurality of substantially liquid streams symmetrically positioned about the periphery of the chamber and directed substantially radially into the chamber, gas atomizing the streams as they enter the chamber to form liquid sprays and so directing the sprays into the chamber that the symmetrical axis of each spray is initially directed downstream and inwardly from the chamber wall, each to the corresponding side of the longitudinal axis and at an angle to the radius of the chamber, thereby causing the entering spray streams to swirl about said chamber axis.

2. The process of claim 1 in which the axis of symmetry of the respective sprays is so directed as to form an angle of about 30° with the radius of the chamber.

3. The process of claim 1 in which the axis of symmetry of the respective sprays is so directed as to form an angle of about 30° with the radius of the chamber and an angle of about 30° with a plane common to the longitudinal axis of the chamber and the longitudinal axis of the liquid stream passing through the chamber wall.

4. The process of producing carbon black by the decomposition of a normally liquid hydrocarbon which comprises injecting a combustible mixture of a fluid fuel and an oxygen-containing gas longitudinally into one end of an elongated, cylindrical, heat-insulated reaction chamber and burning the mixture as it enters the chamber to form a highly turbulent stream of hot blast flame gases flowing longitudinally through the chamber, separately and forcefully injecting a plurality of gas-atomized sprays of the liquid hydrocarbon to be decomposed into the hot gas stream passing through the chamber and so directing the sprays of hydrocarbon into the chamber that the symmetrical axis of each spray is initially directed downstream and inwardly from the chamber wall, each to the corresponding side of the longitudinal axis and at an angle to the radius of the chamber, thereby causing the entering hydrocarbon sprays to swirl about the longitudinal axis of the chamber as it passes through said chamber, and thereby decomposing the hydrocarbon by heat absorbed from the hot gases to form carbon black in gaseous suspension, withdrawing the suspension from the downstream end of the chamber and separating and collecting the carbon black.

References Cited in the file of this patent

UNITED STATES PATENTS

| | | |
|---|---|---|
| 2,378,055 | Wiegand et al. | June 12, 1945 |
| 2,440,424 | Wiegand et al. | Apr. 27, 1948 |
| 2,599,981 | Ekholm | June 10, 1952 |
| 2,659,662 | Heller | Nov. 17, 1953 |